(12) United States Patent
Ko

(10) Patent No.: US 11,128,969 B2
(45) Date of Patent: Sep. 21, 2021

(54) ELECTRONIC DEVICE AND MOBILE DEVICE FOR ANALYZING USER'S VOICE USING A PLURALITY OF MICROPHONES

(71) Applicant: SAMSUNG ELECTRONICS CO., LTD., Suwon-si (KR)

(72) Inventor: Dong-Gyun Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/794,271

(22) Filed: Feb. 19, 2020

(65) Prior Publication Data

US 2020/0382887 A1    Dec. 3, 2020

(30) Foreign Application Priority Data

Jun. 3, 2019 (KR) .................. 10-2019-0065150

(51) Int. Cl.
| | |
|---|---|
| *H04R 3/00* | (2006.01) |
| *H04R 29/00* | (2006.01) |
| *H04R 1/04* | (2006.01) |
| *H04R 1/40* | (2006.01) |
| *G06F 3/14* | (2006.01) |
| *G06F 3/0488* | (2013.01) |
| *H04M 1/72454* | (2021.01) |

(52) U.S. Cl.
CPC ......... *H04R 29/005* (2013.01); *G06F 3/0488* (2013.01); *G06F 3/14* (2013.01); *H04M 1/72454* (2021.01); *H04R 1/04* (2013.01); *H04R 1/406* (2013.01); *H04R 3/005* (2013.01); *H04R 29/001* (2013.01); *H04R 2499/11* (2013.01); *H04R 2499/15* (2013.01)

(58) Field of Classification Search
CPC ........ H04R 29/005; H04R 3/005; H04R 1/04; H04R 1/406; H04R 29/001; H04R 2499/15; H04R 2499/11; H04M 1/72569; G06F 3/14; G06F 3/0488
See application file for complete search history.

(56) References Cited

U.S. PATENT DOCUMENTS

| | | |
|---|---|---|
| 5,805,408 A | 9/1998 | Maraschin et al. |
| 6,195,246 B1 | 2/2001 | Livesay et al. |
| 6,853,850 B2 | 2/2005 | Shim et al. |

(Continued)

FOREIGN PATENT DOCUMENTS

| | | |
|---|---|---|
| CN | 102006350 A | 4/2011 |
| CN | 106550074 A | 3/2017 |

(Continued)

*Primary Examiner* — Ping Lee
(74) *Attorney, Agent, or Firm* — Volentine, Whitt & Francos, PLLC

(57) ABSTRACT

An electronic device includes a first microphone, a second microphone, a digital signal processor, and a detector. The first microphone samples a sound from a sound source at a first location to generate a first signal. The second microphone samples the sound from the sound source at a second location spaced from the first location to generate a second signal. The digital signal processor compares the first signal and the second signal to obtain external environment information associated with a location of the sound source. The detector determines a call mode, based on the external environment information.

16 Claims, 10 Drawing Sheets

(56) References Cited

U.S. PATENT DOCUMENTS

| | | | |
|---|---|---|---|
| 7,751,575 | B1 | 6/2010 | Baumhauer, Jr. et al. |
| 8,189,429 | B2 | 5/2012 | Chen et al. |
| 8,320,974 | B2 | 11/2012 | Nicholson |
| 2004/0141418 | A1* | 7/2004 | Matsuo .................. G01S 11/14 367/124 |
| 2004/0253994 | A1 | 12/2004 | Lampl et al. |
| 2012/0320491 | A1 | 12/2012 | Doh |
| 2013/0282372 | A1* | 10/2013 | Visser .................... G10L 15/20 704/233 |
| 2014/0194102 | A1* | 7/2014 | Strazisar .......... H04M 1/72569 455/418 |
| 2015/0036259 | A1 | 2/2015 | Cox et al. |
| 2015/0049410 | A1 | 2/2015 | Ono |
| 2015/0350395 | A1* | 12/2015 | Jiang ...................... H04M 1/60 455/570 |
| 2018/0044784 | A1 | 2/2018 | Boughton et al. |
| 2018/0122633 | A1 | 5/2018 | Leeser |
| 2018/0152795 | A1* | 5/2018 | Lee .................. G10K 11/17833 |
| 2018/0307270 | A1 | 10/2018 | Pantel |

FOREIGN PATENT DOCUMENTS

| | | |
|---|---|---|
| JP | 2003168725 A | 6/2003 |
| KR | 10-0724420 B1 | 6/2007 |
| KR | 20080088961 A | 10/2008 |

\* cited by examiner

ELECTRONIC DEVICE AND MOBILE DEVICE FOR ANALYZING USER'S VOICE USING A PLURALITY OF MICROPHONES

CROSS-REFERENCE TO RELATED APPLICATIONS

A claim for priority under 35 U.S.C. § 119 is made to Korean Patent Application No. 10-2019-0065150 filed on Jun. 3, 2019, in the Korean Intellectual Property Office, the entire content of which is hereby incorporated by reference.

BACKGROUND

The present inventive concepts relate to electronic devices and mobile devices, and more particularly to electronic devices and mobile devices which include a plurality of microphones.

Electronic device terminals may generally be classified as either mobile (i.e., portable) terminals or stationary terminals depending on whether movement of the terminal is possible. Mobile terminals may be classified as either handheld terminals or vehicle mount terminals depending on whether the terminal is directly carried by a user. For example, mobile terminals may be implemented as electronic devices such as smartphones, tablet personal computers (PCs), and wearable devices.

Mobile terminals provide a user with a call service. A user may talk with another party using the mobile terminal. Functions of mobile terminals are diversifying as semiconductor technologies develop. As the functions of mobile terminals (e.g., smartphones) become more diversified, users may perform various operations using the mobile terminal while talking over the phone. For example, when the user talks with another party using an earphone, the user may manipulate the smartphone screen while talking over the phone.

SUMMARY

Embodiments of the inventive concept provide an electronic device and a mobile device for analyzing a user's voice by using microphones.

Embodiments of the inventive concepts provide an electronic device including a first microphone, a second microphone, a digital signal processor, and a detector. The first microphone is at a first location and samples a sound from a sound source to generate a first signal. The second microphone is at a second location spaced from the first location and samples the sound from the sound source to generate a second signal. The digital signal processor compares the first signal and the second signal to obtain external environment information associated with a location of the sound source. The detector determines a call mode for the electronic device based on the external environment information.

Embodiments of the inventive concepts further provide an electronic device including a first microphone, a second microphone, and a detector. The first microphone is at a first location and receives a sound output from a sound source and generates a first signal responsive to the sound. The second microphone is at a second location spaced from the first location and receives the sound output from the sound source and generates a second signal responsive to the sound. The detector determines a call mode for the electronic device based on a time length between a first time when the sound is received by the first microphone and a second time when the sound is received by the second microphone.

Embodiments of the inventive concepts still further provide a mobile device providing a call service. The mobile device includes a digital signal processor and a detector. The digital signal processor compares a first signal generated based on a sound from a sound source and a second signal generated based on the sound from the sound source, and obtains first external environment information associated with a location of the sound source based on the comparison. The detector determines a call mode of the mobile device based on the first external environment information. The first signal is generated based on the sound received at a first location on the mobile device. The second signal is generated based on the sound received at a second location on the mobile device. The first location is spaced from the second location.

BRIEF DESCRIPTION OF THE FIGURES

The above and other objects and features of the inventive concepts will become apparent in view of the following detail description of exemplary embodiments thereof taken with reference to the accompanying drawings.

DETAILED DESCRIPTION

Hereinafter, embodiments are described in detail and clearly to such an extent that one of ordinary skill in the art may easily implement the inventive concepts.

As is traditional in the field of the inventive concepts, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concepts. Likewise, the blocks of the embodiments may be physically combined into more complex blocks without departing from the scope of the inventive concepts.

Figure 1:
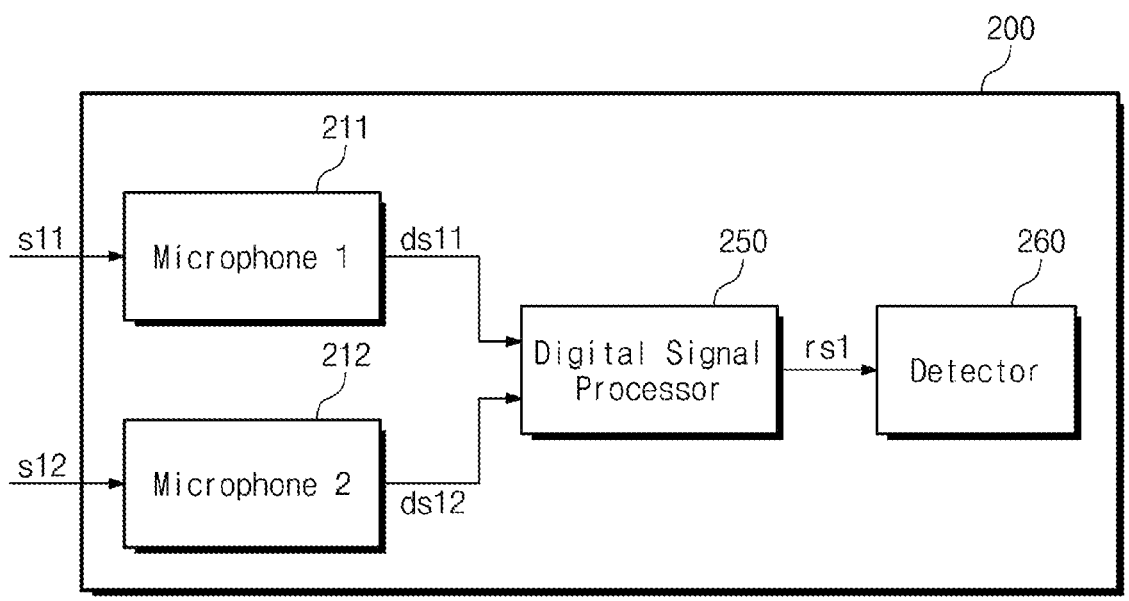
FIG. 1 illustrates a block diagram of an electronic device according to an embodiment of the inventive concepts.

FIG. 1 illustrates a block diagram of an electronic device according to an embodiment of the inventive concepts.

Electronic device 200 as shown in FIG. 1 includes microphones 211 and 212, digital signal processor 250, and detector 260. For better understanding, hereinafter description will be given of electronic device 200 including two microphones 211 and 212. However, the inventive concepts are not limited thereto, and in other embodiments electronic device 200 may include two or more microphones.

The electronic device 200 may provide a user 300 (see FIG. 2) with a call service. The user 300 may talk with another party by using the electronic device 200. The other party may be located far away from the user 300. The electronic device 200 according to an embodiment of the inventive concepts may react to a motion (or a gesture) of the user 300 or a stimulus from the outside more accurately while providing call service. Operations to be described hereinafter correspond to operations that are performed while the electronic device 200 provides a call service.

The electronic device 200 according to various embodiments of the inventive concepts may be implemented with various types of devices. For example, the electronic device 200 may include at least one of a mobile device (e.g., a smartphone), a computer device, a portable multimedia device, a portable medical device, a camera, a wearable device, or home appliances. It should however be understood that the electronic device 200 according to embodiments of the inventive concepts is not limited to the above-described devices, and that in the description hereinafter the electronic device 200 is characterized as a smartphone only for better understanding.

The microphones 211 and 212 may receive signals s11 and s12, respectively. The signals s11 and s12 may be sounds that are generated from a place spaced from the electronic device 200 by as much as a given distance. The signals s11 and s12 may be analog signals. In the following description, a sound that is transferred or provided to the first microphone 211 is defined as the "signal s11", and a sound that is transferred or provided to the second microphone 212 is defined as the "signal s12". The signals s11 and s12 may be generated at the same time.

The first microphone 211 may be spaced from the second microphone 212 by as much as a given distance. Accordingly, distances d1 and d2 (see FIG. 2) from a sound source (in detail, a place where a sound is generated) to the first and second microphones 211 and 212 may be different. Because the distances d1 and d2 are different, the respective times when the signals s11 and s12 are received by the microphones 211 and 212 may be different.

The microphones 211 and 212 convert the signals s11 and s12 into digital signals ds11 and ds12. The microphones 211 and 212 may sample the signals s11 and s12 with sampling frequencies. Depending on the sampling frequencies, the number of times that the signal s11 is sampled per second may be different from the number of times that the signal s12 is sampled per second. Also, depending on the sampling frequencies, an interval between samples that are generated by sampling the signal s11 may be different from an interval between samples that are generated by sampling the signal s12. In detail, when the first microphone 211 samples the signal s11 by using a sampling frequency of 48 kHz, the signal s11 may be sampled 48,000 times per second. That is, the signal s11 may be sampled every $1/48{,}000$ seconds (i.e., 21 microseconds (µs)). In this case, assuming that the speed of sound is about 340 m/s, an interval between samples generated by sampling the signal s11 using a sampling frequency of 48 kHz may be 0.00708 m (i.e., 0.708 cm).

Because the distances d1 and d2 are different, a time when the signal s11 arrives at the first microphone 211 may be different from a time when the signal s12 arrives at the second microphone 212. Accordingly, a difference may be present between samples generated by sampling the signal s11 and samples generated by sampling the signal s12. In detail, there may be samples, which do not correspond to the samples generated by sampling the signal s12, from among the samples generated by sampling the signal s11. In other words, there may be samples from among the samples generated by the sampling signal s11 which do not correspond to (i.e., match with) the samples generated by the sampling signal s12. In the following description, samples, which do not correspond to the samples generated by sampling the signal s12, from among the samples generated by sampling the signal s11 are called "unique samples".

Also, a difference may be present between bit values of the digital signal ds11 and bit values of the digital signal ds12. In detail, there may be bits, which do not correspond to the bits of the digital signal ds12, from among the bits of the digital signal ds11. In other words, there may be bits from among the bits of the digital signal ds11 which do not correspond to (i.e., match with) the bits of the digital signal ds12. In detail, bits, which do not correspond to the bits of the digital signal ds12, from among the bits of the digital signal ds11 are called "unique bits of the digital signal ds11". The unique bits of the digital signal ds11 will be more fully described with reference to FIG. 4.

The digital signal processor 250 receives the digital signals ds11 and ds12. The digital signal processor 250 may compare bit values of the digital signals ds11 and ds12 to obtain information about a distance of the user 300. In detail, the information about the distance of the user 300 may include information about the number of unique bits of the digital signal ds11 or information about the number of unique samples of the digital signal ds11. A process in which the digital signal processor 250 obtains information about a distance of the user 300 will be more fully described with reference to FIGS. 3 and 4. The information about the distance of the user 300 may be expressed as external environment information.

The digital signal processor 250 generates a signal rs1. The signal rs1 may include the information about the distance of the user 300.

The detector 260 receives the signal rs1. The detector 260 may obtain the information about the distance of the user 300 from the signal rs1. For example, the signal rs1 may include information about the number of unique samples. The detector 260 may compare the number of unique samples with a reference sample number to determine a call mode of the electronic device 200. However, the inventive concepts are not limited thereto, and the function and the operation of the detector 260 may be performed by a main processor (such as main processor 121 of FIG. 11 for example).

In detail, when the number of unique samples is smaller than the reference sample number, the detector 260 may determine the call mode as an active mode. That is, in the case where the user 300 is spaced from the electronic device 200 as much as a given distance, the electronic device 200 may provide a service (e.g., text messaging, internet search) corresponding to directions of the user 300 while providing a call service. When the number of unique samples is greater than the reference sample number, the detector 260 may determine the call mode as an inactive mode. That is, in the case where the user 300 is close to the electronic device 200 or a face of the user 300 contacts the electronic device 200, the electronic device 200 may not react to a touch of the user 300 or an external stimulus. That is, the electronic device 200 may not react to an unintended touch of the user 300 and thus may not operate abnormally.

Figure 2:
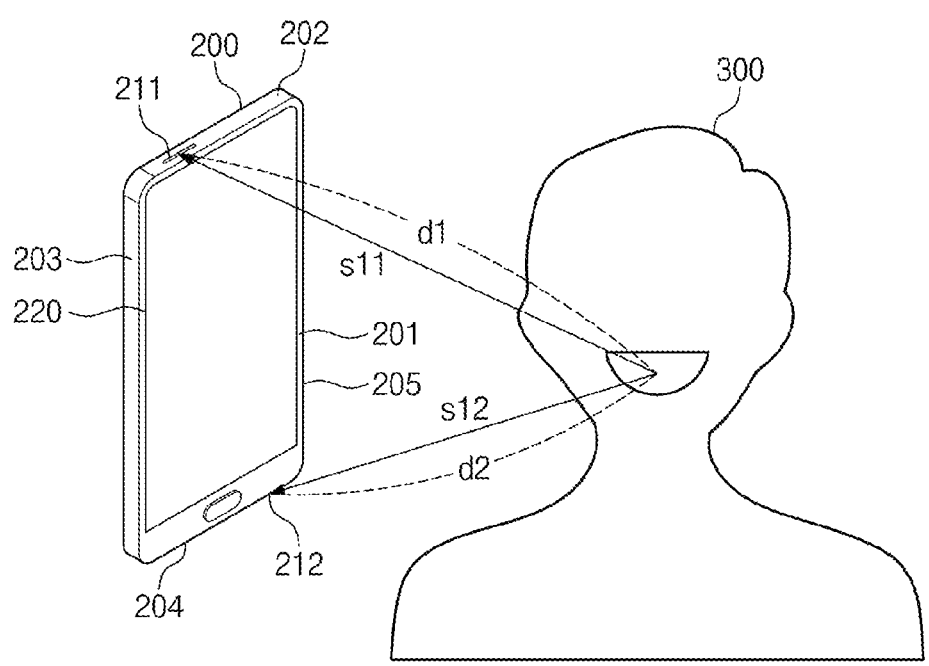
FIG. 2 illustrates a conceptual diagram descriptive of a method in which an electronic device determines a location of a user according to an embodiment of the inventive concepts.

FIG. 2 illustrates a conceptual diagram descriptive of a method in which an electronic device determines a location of a user according to an embodiment of the inventive concepts.

The electronic device 200 may output a voice of the other party through a speaker. The speaker may be located on one of a front surface 201 or side surfaces 202, 203, 204 and 205 of the electronic device 200. The user 300 may move the user's face to approach the electronic device 200 or to contact the front surface 201 of the electronic device 200 to hear the voice of the other party.

The electronic device 200 may include the microphones 211 and 212. The microphones 211 and 212 may be located on any of the side surfaces 202, 203, 204, and 205 of the electronic device 200. For example, as shown in FIG. 2 the microphones 211 and 212 may be located on the side surfaces 202 and 204, respectively. However, the inventive concepts are not limited thereto, and in other embodiments the microphones 211 and 212 may be located on different side surfaces or may be located on one side surface of the side surfaces 202, 203, 204, and 205 so as to be spaced from each other.

That is, the first microphone 211 may be spaced from the second microphone 212 by as much as a given distance. In detail, the first microphone 211 may be located at a left end portion of the side surface 202 of the electronic device 200, and the second microphone 212 may be located at a right end portion of the side surface 204 of the electronic device 200. A distance between the microphones 211 and 212 may be associated with the size of the electronic device 200. The microphones 211 and 212 may be spaced from the user 300 by as much as the distances d1 and d2, respectively. Because the microphones 211 and 212 are spaced from each other, the distances d1 and d2 may be different.

The user 300 may utter a sound at a place that is spaced from the electronic device 200 by as much as a given distance. A sound that is uttered by the user 300 at a given time may be transferred (provided) to each of the microphones 211 and 212. In the following description, a sound that is transferred to the first microphone 211 is called the "signal s11". Also, a sound that is transferred to the second microphone 212 is called the "signal s12". The signals s11 and s12 may be generated at the same time. However, because the distances d1 and d2 are different, times when the signals s11 and s12 are received by the microphones 211 and 212 may be different.

The electronic device 200 may determine a call mode based on a difference between the times when the signals s11 and s12 are received.

The call mode may include the active mode and the inactive mode. In the active mode, the electronic device 200 activates a display panel 220. That is, in the active mode, when the user 300 touches the display panel 220 or a stimulus is applied to the display panel 220 from the outside, the electronic device 200 may respond to the touch or the stimulus. Accordingly, in the active mode, even while talking over the phone, the user 300 may send a message to the other party or may use an internet search service. In the inactive mode, the electronic device 200 deactivates the display panel 220. That is, in the inactive mode, when the user 300 touches the display panel 220 or a stimulus is applied to the display panel 220 from the outside, the electronic device 200 does not respond to the touch or stimulus. Accordingly, in the inactive mode, even though the user 300 touches the display panel 220 unconsciously or unintentionally, a call is not terminated or an application is not executed However, the inventive concepts are not limited thereto. For example, the call mode may include a speaker phone mode and a receive mode. When the user 300 is distant from the electronic device 200, the electronic device 200 may provide the call service in the speaker phone mode. When the user 300 is located to be close to the electronic device 200, the electronic device 200 may provide the call service in the receive mode. In the speaker phone mode, the electronic device 200 may output a sound of the other party and a sound from the electronic device 200 to be more loud than in the receive mode. When the user 300 is moving away from the electronic device 200 while talking over the phone, the electronic device 200 may change the call mode from the receive mode to the speaker phone mode. Hereinafter, although description will be given as the electronic device 200 selects the call mode from the active mode and the inactive mode, the inventive concepts are not limited thereto. For example, the active mode and the inactive mode may be replaced with the speaker phone mode and the receive mode, respectively.

A difference between times when the signals s11 and s12 are received may vary depending on a distance between the electronic device 200 and the user 300. In the following description, a distance between the electronic device 200 and the user 300 is referred to as a "distance of the user 300". That is, the electronic device 200 may determine a call mode based on the distance of the user 300. In detail, when the user 300 approaches the electronic device 200 or contacts one surface of the electronic device 200, the electronic device 200 may change the call mode from the active mode to the inactive mode.

As described with reference to FIG. 2, the microphones 211 and 212 are disposed on the side surfaces 202 to 205 of the electronic device 200. Accordingly, the electronic device 200 may include a wider display panel 220. For example, the electronic device 200 may be a bezel-less smartphone. The bezel of an electronic device may be a grooved ring that holds a display panel in place, and may include the remaining components of the front surface of the electronic device other than the display panel. That is, the bezel-less smartphone may be a smartphone in which components to be disposed on a front surface (e.g., 201) are minimized.

Also, the electronic device 200 may use the microphones 211 and 212 for the purpose of improving a speech (or voice) quality while talking over the phone. Accordingly, the electronic device 200 may determine the call mode while improving the speech quality by using the microphones 211 and 212, thus reducing power consumption.

Figure 3:
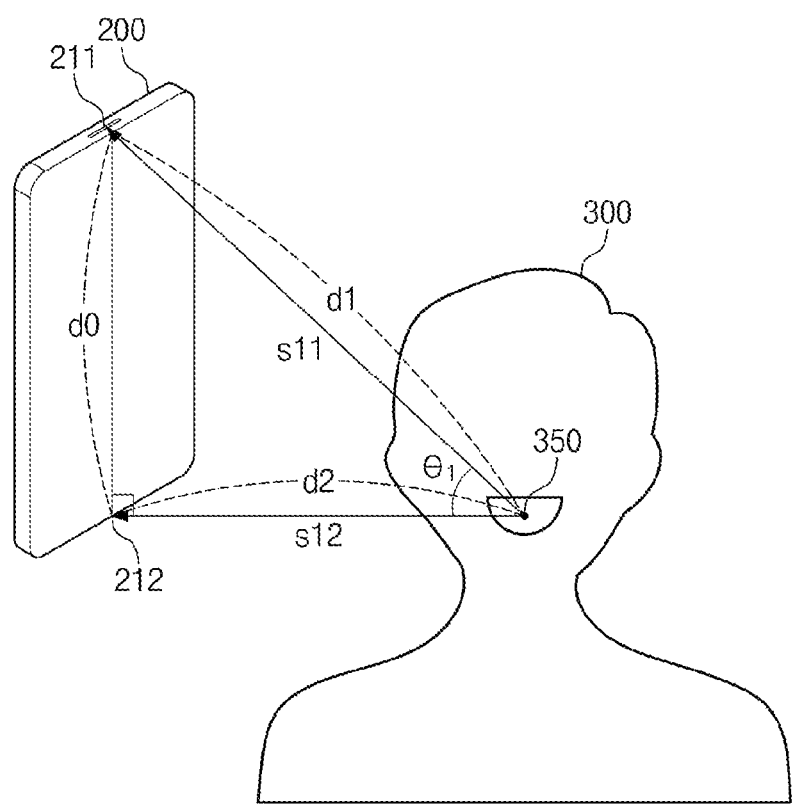
FIG. 3 illustrates a conceptual diagram descriptive of a relationship between a distance of a user and the number of unique samples.

FIG. 3 illustrates a conceptual diagram descriptive of a relationship between a distance of a user and the number of unique samples.

In the following description, a place where a sound is uttered by the user 300 is referred to as a "sound source 350". In the following description, it is assumed for better understanding that the microphones 211 and 212 are located on the same vertical line. Also, it is assumed that the sound source 350 is located on the same horizontal line as the second microphone 212.

As described with reference to FIG. 2, the microphones 211 and 212 may be spaced from each other as much as a given distance d0. Also, the microphones 211 and 212 may be spaced from the sound source 350 as much as the distances d1 and d2, respectively.

The number of unique samples described with reference to FIG. 1 may vary depending on the distance d2. In detail, the number of unique samples may be inversely proportional to the distance d2. The number of unique bits of the digital signal ds11 may be proportional to the number of unique samples. A relationship between the number of unique bits of the digital signal ds11 and the number of unique samples will be more fully described with reference to FIG. 4. For example, when the user 300 is moving away from the electronic device 200, the number of unique samples may decrease. As another example, when the user 300 approaches the electronic device 200, the number of unique samples may increase.

A relationship between the distances d0, d1, and d2 and the number of unique samples will be described with reference to Table 1 below.

In Table 1, it is assumed that the distance d0 between the microphones 211 and 212 is 0.1 m. Referring to Equation 1 below, an included angle $\theta_1$ between a movement path of the signal s11 and a movement path of the signal s12 may be calculated based on the distance d2 and the distance d0. The magnitude of the included angle $\theta_1$ may decrease as the distance d2 between the sound source 350 and the second microphone 212 increases. Referring to Equation 2 below, the distance d1 between the sound source 350 and the first microphone 211 may be calculated based on the included angle $\theta_1$ and the distance d0.

$$d2 = d0/\tan(\theta_1) \quad \text{[Equation 1]}$$

$$d1 = d0/\sin(\theta_1) \quad \text{[Equation 2]}$$

As in a change in the magnitude of the included angle $\theta_1$, a difference between the distance d1 and the distance d2 may also decrease as the distance d2 increases. Accordingly, as the distance d2 increases, a difference between a time when the signal s11 arrives at the first microphone 211 and a time when the signal s12 arrives at the second microphone 212 may decrease. Also, the number of unique samples may decrease. Referring to Table 1, when the distance d2 is 0 m (i.e., when a face of the user 300 contacts the electronic device 200), the number of unique samples may be about 14. When the distance d2 is 0.66 m (i.e., when the user 300 is relatively far away from the electronic device 200), the number of unique samples may be about 1.

When the reference sample number is set to 3 and the user 300 is spaced from the electronic device 200 as much as 0.21 m, the detector 260 of FIG. 1 may determine the call mode as the inactive mode. Also, when the reference sample number is set to 3 and the user 300 is spaced from the electronic device 200 as much as 0.24 m, the detector 260 of FIG. 1 may determine the call mode as an active mode.

Figure 4:
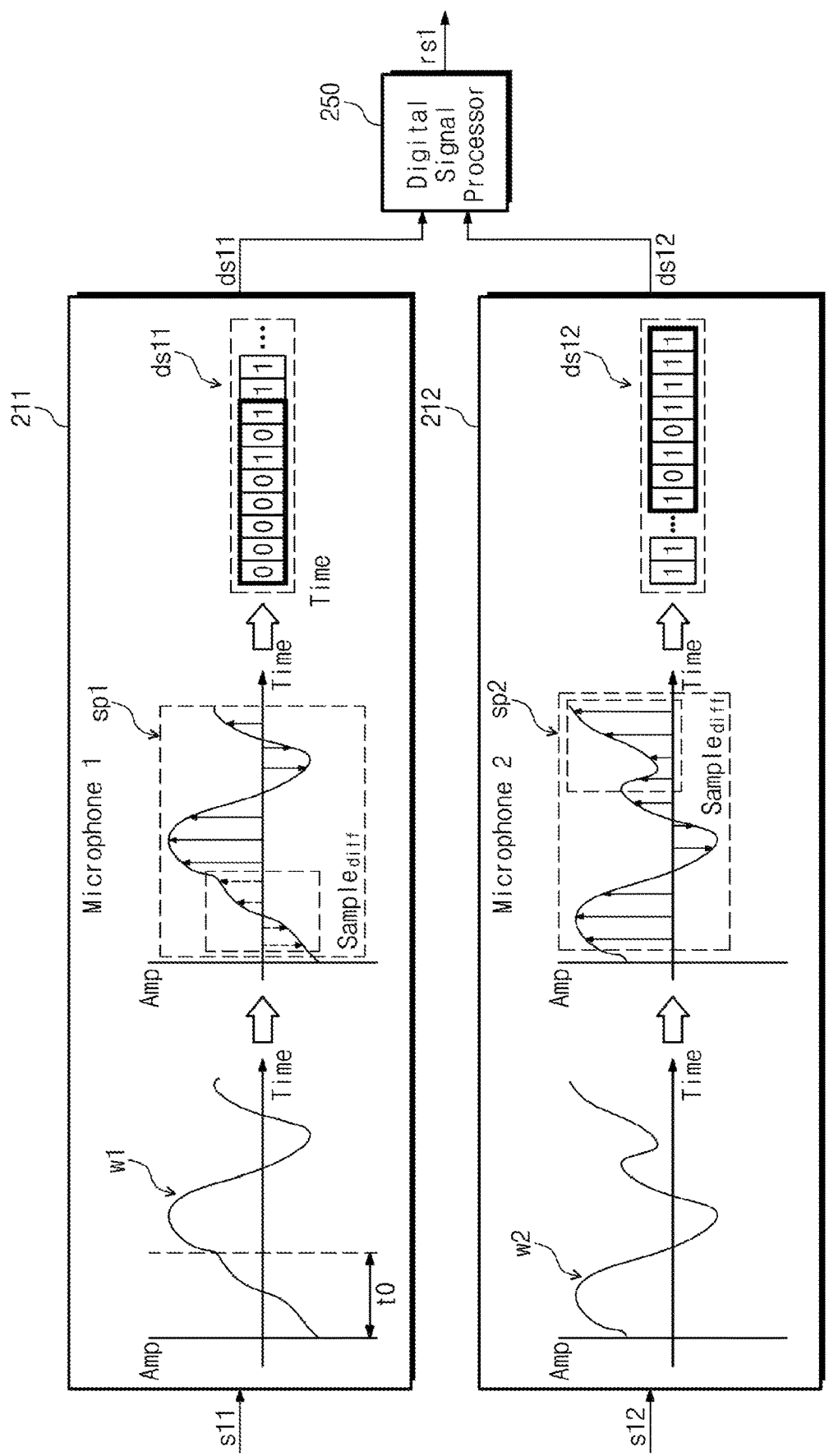
FIG. 4 illustrates a conceptual diagram descriptive of an operation in which microphones generate digital signals.

FIG. 4 illustrates a conceptual diagram descriptive of an operation in which microphones generate digital signals.

Exemplary waveforms of the signals s11 and s12 and sample signals sp1 and sp2 are illustrated in FIG. 4. As described with reference to FIGS. 2 and 3, the signals s11 and s12 may be analog signals. Accordingly, there may be a difference between a time when the signal s11 arrives at the first microphone 211 and a time when the signal s12 arrives at the second microphone 212.

TABLE 1

| d0[m] | d2[m] | tan($\theta_1$) | $\theta_1$ | sin($\theta_1$) | d1[m] | (d1 − d2)[m] | The number of unique samples |
|---|---|---|---|---|---|---|---|
| 0.1 | 0.00 | 1000.000 | 1.570 | 1.000 | 0.100 | 0.100 | 14.104 |
| 0.1 | 0.03 | 3.322 | 1.278 | 0.958 | 0.104 | 0.074 | 10.494 |
| 0.1 | 0.06 | 1.664 | 1.030 | 0.857 | 0.117 | 0.057 | 7.986 |
| 0.1 | 0.09 | 1.110 | 0.837 | 0.743 | 0.135 | 0.045 | 6.283 |
| 0.1 | 0.12 | 0.833 | 0.694 | 0.640 | 0.156 | 0.036 | 5.108 |
| 0.1 | 0.15 | 0.666 | 0.588 | 0.554 | 0.180 | 0.030 | 4.272 |
| 0.1 | 0.18 | 0.555 | 0.507 | 0.485 | 0.206 | 0.026 | 3.656 |
| 0.1 | 0.21 | 0.476 | 0.444 | 0.430 | 0.233 | 0.023 | 3.188 |
| 0.1 | 0.24 | 0.416 | 0.395 | 0.384 | 0.260 | 0.020 | 2.822 |
| 0.1 | 0.27 | 0.370 | 0.355 | 0.347 | 0.288 | 0.018 | 2.530 |
| 0.1 | 0.30 | 0.333 | 0.322 | 0.316 | 0.316 | 0.016 | 2.290 |
| 0.1 | 0.33 | 0.303 | 0.294 | 0.290 | 0.345 | 0.015 | 2.091 |
| 0.1 | 0.36 | 0.278 | 0.271 | 0.268 | 0.374 | 0.014 | 1.924 |
| 0.1 | 0.39 | 0.256 | 0.251 | 0.248 | 0.403 | 0.013 | 1.781 |
| 0.1 | 0.42 | 0.238 | 0.234 | 0.232 | 0.432 | 0.012 | 1.657 |
| 0.1 | 0.45 | 0.222 | 0.219 | 0.217 | 0.461 | 0.011 | 1.549 |
| 0.1 | 0.48 | 0.208 | 0.205 | 0.204 | 0.490 | 0.010 | 1.455 |
| 0.1 | 0.51 | 0.196 | 0.194 | 0.192 | 0.520 | 0.010 | 1.371 |
| 0.1 | 0.54 | 0.185 | 0.183 | 0.182 | 0.549 | 0.009 | 1.296 |
| 0.1 | 0.57 | 0.175 | 0.174 | 0.173 | 0.579 | 0.009 | 1.229 |
| 0.1 | 0.60 | 0.167 | 0.165 | 0.164 | 0.608 | 0.008 | 1.168 |
| 0.1 | 0.63 | 0.159 | 0.157 | 0.157 | 0.638 | 0.008 | 1.113 |
| 0.1 | 0.66 | 0.151 | 0.150 | 0.150 | 0.668 | 0.008 | 1.063 |

Referring to FIG. 4, graph w1 indicates the signal s11 received by the first microphone 211, and graph w2 indicates the signal s12 received by the second microphone 212. Referring to graph w1 and graph w2, a time when the signal s11 is received by the first microphone 211 may be later than (i.e., after) a time when the signal s12 is received by the second microphone 212, by as much as "t0". That is, there may be a phase difference between the signal s11 received by the first microphone 211 and the signal s12 received by the second microphone 212. "t0" may be characterized as a time length. The time length (i.e., phase difference) is inversely proportional to a distance between the sound source 350 and the electronic device 200.

However, the inventive concepts are not limited thereto. For example, in other embodiments the user 300 of FIG. 3 may be located on the same horizontal line as the first microphone 211. In this case, a time when the signal s11 is received by the first microphone 211 may be faster than (i.e., before) a time when the signal s12 is received by the second microphone 212, by as much as "t0".

As described with reference to FIG. 2, the microphones 211 and 212 may sample the signals s11 and s12. The microphones 211 and 212 may sample the signals s11 and s12 to generate the sample signals sp1 and sp2. In the following description, it is assumed that the microphones 211 and 212 generate the sample signals sp1 and sp2 by using the signals s11 and s12 received during a given time. Due to the phase difference between the signal s11 received by the first microphone 211 and the signal s12 received by the second microphone 212, samples included in the sample signal sp1 may be different from samples included in the sample signal sp2. In detail, the sample signal sp1 may include common samples that are common to the sample signals sp1 and sp2, and may further include unique samples as well as the common samples. The unique samples of the sample signal sp1 may be located continuously in the front of the common samples. The unique samples of the sample signal sp1 are included in the sample signal sp1 but are not included in the sample signal sp2. For example, referring to FIG. 4, the sample signal sp1 includes four unique samples (indicated as Sample$_{diff}$).

The microphones 211 and 212 may quantize the sample signals sp1 and sp2 to generate the digital signals ds11 and ds12. Assuming that the sample signals sp1 and sp2 include only common samples, all bits of the digital signal ds11 would correspond to all bits of the digital signal ds12. In the following description, that first bits correspond to second bits means that bit values of the first bits are the same as bit values of the second bits.

As described above, the sample signal sp1 may include unique samples as well as common samples. Due to the unique samples, some bits of the digital signal ds11 may not correspond to bits of the digital signal ds12. In the following description, some bits that do not correspond to bits of the digital signal ds12 are called "unique bits of the digital signal ds11". Also, bits that correspond to bits of the digital signal ds12 are called "common bits". Unique bits of the digital signal ds11 may be located continuously in the front of the common bits. The unique bits of the digital signal ds11 may be bits that are generated based on unique samples of the digital signal ds11. That is, the number of unique bits of the digital signal ds11 may be proportional to the number of unique samples of the digital signal ds11.

For example, referring to FIG. 4, unique bits of the digital signal ds11 may be "00000101", and common bits of the digital signal ds11 may be "11". The unique bits of the digital signal ds11, that is, "00000101" may come from the unique samples of the digital signal ds11. Assuming that two continuous bits indicates one sample, that the number of unique bits of the digital signal ds11 is 8 means that the sample signal sp1 includes four unique samples. However, bit values of the digital signals ds11 and ds12 illustrated in FIG. 4 are only exemplary values, and the inventive concepts are not limited thereto.

The digital signal processor 250 receives the digital signals ds11 and ds12 from the microphones 211 and 212. The digital signal processor 250 may compare the digital signals ds11 and ds12. The digital signal processor 250 may compare the digital signals ds11 and ds12 to calculate the number of unique bits of the digital signal ds11. The digital signal processor 250 may calculate the number of unique samples of the sample signal sp1 by calculating the number of unique bits.

The digital signal processor 250 may generate the signal rs1 based on a result of comparing the digital signals ds11 and ds12. The signal rs1 may include, but is not limited to, information about the number of unique bits of the digital signal ds11 and/or information about the number of unique samples of the sample signal sp1.

Also, the inventive concepts are not limited thereto. The digital signal processor 250 may calculate the number of unique bits to calculate the distance d2 of the user 300 and/or a phase difference between the signal s11 received by the first microphone 211 and the signal s12 received by the second microphone 212. Also, the signal rs1 may include information about the phase difference between the signal s11 received by the first microphone 211 and the signal s12 received by the second microphone 212 and/or information about the distance d2 of the user 300.

As assumed above, the microphones 211 and 212 generate the sample signals sp1 and sp2 by using the signals s11 and s12 received during the given time. Accordingly, when the sample signal sp1 includes unique samples, the sample signal sp2 may also include unique samples as well as common samples. Because the signal s12 is received prior to the signal s11, unique samples of the sample signal sp2 may be located continuously at the back of the common samples (indicated as Sample$_{diff}$). Also, the digital signal ds12 may include unique bits as well as common bits. The unique bits of the digital signal ds12 may be located continuously at the back of the common bits. The unique bits of the digital signal ds12 may be bits that are generated based on unique samples of the digital signal ds12. That is, the number of unique bits of the digital signal ds12 may be proportional to the number of unique samples of the digital signal ds12. For example, referring to FIG. 4, common bits of the digital signal ds12 may be "11", and unique bits of the digital signal ds12 may be "10101111".

The digital signal processor 250 may compare the digital signals ds11 and ds12 to calculate the number of unique bits of the digital signal ds12. The digital signal processor 250 may calculate the number of unique bits of the digital signal ds12 to calculate the number of unique samples of the sample signal sp2.

The digital signal processor 250 may generate the signal rs1 based on a result of comparing the digital signals ds11 and ds12. The signal rs1 may include, but is not limited to, information about the number of unique bits of the digital signal ds12 and/or information about the number of unique samples of the sample signal sp2.

However, the inventive concepts are not limited to the example that analog-to-digital conversion of the signals s11 and s12 are performed by the microphones 211 and 212. For example, in other embodiments analog-to-digital conversion of the signals s11 and s12 may be performed by an analog-to-digital converter ADC that is provided outside the microphones 211 and 212. In this case, the microphones 211 and 212 may transmit the received signals s11 and s12 to the ADC. The ADC may perform analog-to-digital conversion on the signals s11 and s12 to generate the digital signals ds11 and ds12.

Figure 5:
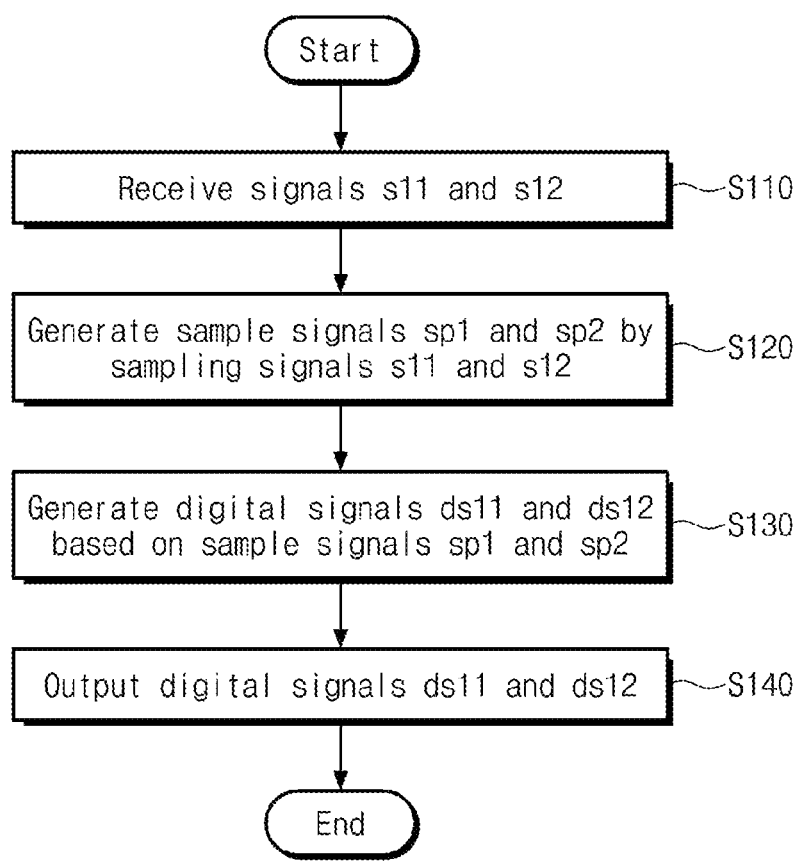
FIG. 5 illustrates a flowchart descriptive of an operation of microphones of FIG. 4.

FIG. 5 illustrates a flowchart descriptive of an operation of microphones of FIG. 4.

In operation S110, the microphones 211 and 212 of FIG. 4 receive the signals s11 and s12. The signals s11 and s12 may be analog signals that are generated from the sound source 350 of FIG. 3 at the same time.

In operation S120, the microphones 211 and 212 sample the signals s11 and s12 to generate the sample signals sp1 and sp2. Each of the sample signals sp1 and sp2 may include unique samples.

In operation S130, the microphones 211 and 212 quantize the sample signals sp1 and sp2 to generate the digital signals ds11 and ds12. Each of the digital signals ds11 and ds12 may include unique bits. The unique bits of the digital signals ds11 and ds12 may be generated by the unique samples of the sample signals sp1 and sp2.

In operation S140, the microphones 211 and 212 output the digital signals ds11 and ds12 to the digital signal processor 250 of FIG. 4.

Figure 6:
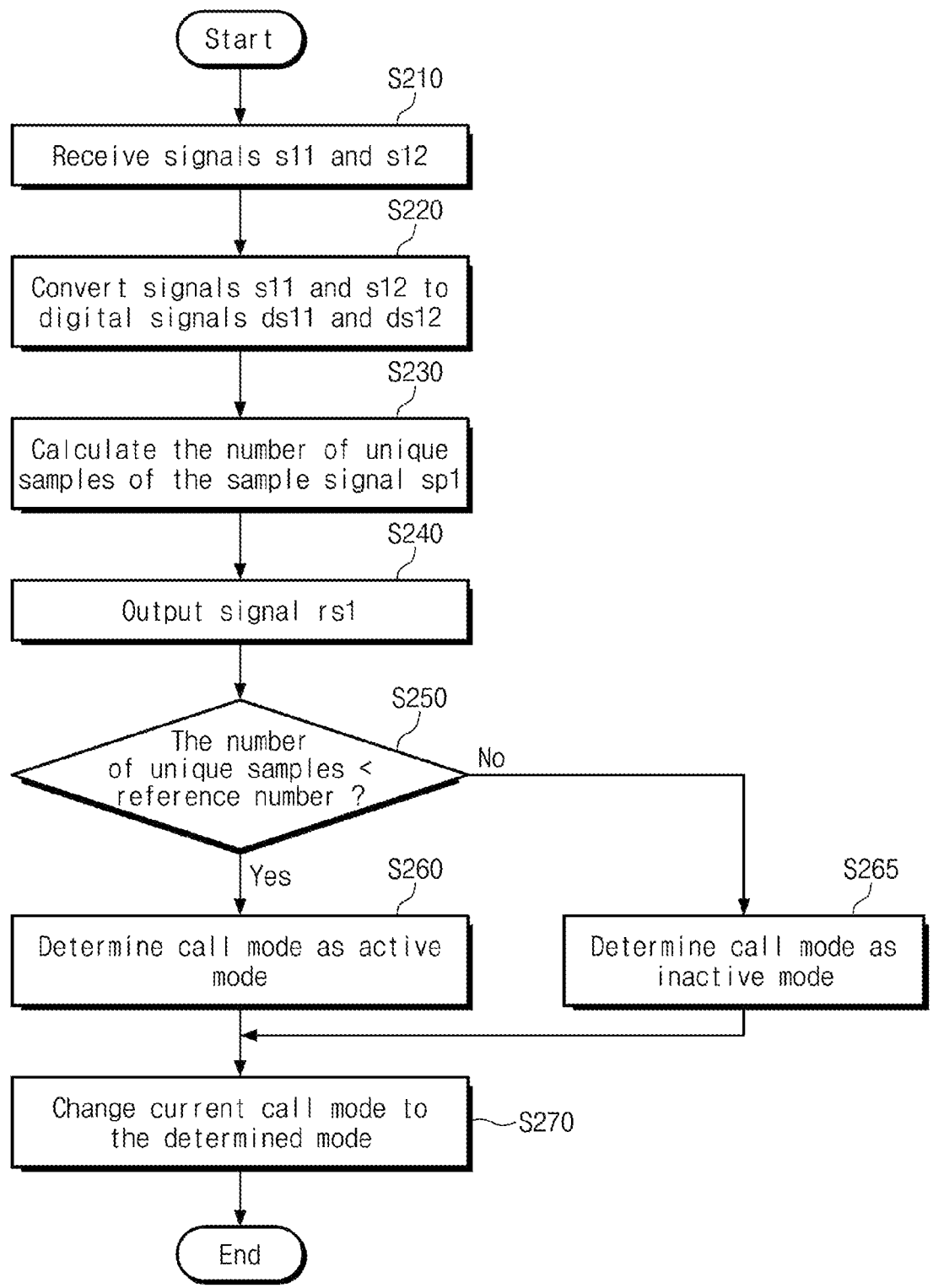
FIG. 6 illustrates a flowchart descriptive of an operation of an electronic device of FIG. 1.

FIG. 6 illustrates a flowchart descriptive of an operation of an electronic device of FIG. 1.

In operation S210, the microphones 211 and 212 of FIG. 1 receive the signals s11 and s12 of FIG. 1.

In operation S220, the microphones 211 and 212 convert the signals s11 and s12 into digital signals ds11 and ds12 of FIG. 4. The microphones 211 and 212 may output the digital signals ds11 and ds12 to the digital signal processor 250 of FIG. 1.

In operation S230, the digital signal processor 250 compares the digital signals ds11 and ds12. In detail, the digital signal processor 250 may compare bit values of the digital signals ds11 and ds12. The digital signal processor 250 may compare the digital signals ds11 and ds12 to calculate the number of unique samples of the sample signal sp1 of FIG. 4. However, the inventive concepts are not limited thereto. For example, in other embodiments the digital signal processor 250 may calculate the number of unique samples of the sample signal sp2 of FIG. 4, the number of unique bits of the digital signal ds11, and the number of unique bits of the digital signal ds12.

In operation S240, the digital signal processor 250 outputs the signal rs1 of FIG. 1 to the detector 260 of FIG. 1. The signal rs1 may include information about the number of unique samples of the sample signal sp1. However, the inventive concepts are not limited thereto. For example, in other embodiments the signal rs1 may include information about the number of unique samples of the sample signal sp2, information about the number of unique bits of the digital signal ds11, and/or information about the number of unique bits of the digital signal ds12.

In operation S250, the detector 260 compares the number of unique samples of the sample signal sp1 with a reference number.

When the number of unique samples of the sample signal sp1 is less than the reference number (Yes in S250), the procedure proceeds to operation S260. In operation S260, the detector 260 determines the call mode of the electronic device 200 of FIG. 1 as the active mode.

When the number of unique samples of the sample signal sp1 is more than the reference number (No in S250), the procedure proceeds to operation S265. In operation S265, the detector 260 determines the call mode of the electronic device 200 of FIG. 1 as the inactive mode.

In operation S270, the detector 260 changes the current call mode of the electronic device 200 to the call mode determined in operation S260 or operation S265.

However, the inventive concepts are not limited thereto. For example, in other embodiments the electronic device 200 may determine the call mode based on one of the number of unique samples of the sample signal sp2, the number of unique bits of the digital signal ds11, the number of unique bits of the digital signal ds12, a phase difference between the signal s11 received by the first microphone 211 and the signal s12 received by the second microphone 212, and the distance d2 of the user 300, instead of the number of unique samples of the sample signal sp1. In this case, the electronic device 200 may determine the call mode in a way that is the same as the way to determine the call mode based on the number of unique samples of the sample signal sp1. For example, when the electronic device 200 determines the call mode based on a phase difference between the signal s11 received by the first microphone 211 and the signal s12 received by the second microphone 212, the phase difference may be compared to a reference magnitude, whereby the active mode may be determined when the phase difference is less than the reference magnitude and the inactive mode is determined when the phase difference is greater than the reference magnitude. Similarly, when the electronic device 200 determines the call mode based on a time length between when the signal s11 is received by the first microphone 211 and when the signal s12 is received by the second microphone 212, the time length may be compared to a reference length, whereby the active mode may be determined when the time length is shorter than the reference length and the inactive mode is determined when the time length is longer than the reference length. However, in the case where the call mode is determined based on the distance d2 of the user 300, the electronic device 200 may select the active mode when the distance d2 of the user 300 is longer than a reference distance and may select the inactive mode when the distance d2 of the user 300 is shorter than the reference distance.

Figure 7:
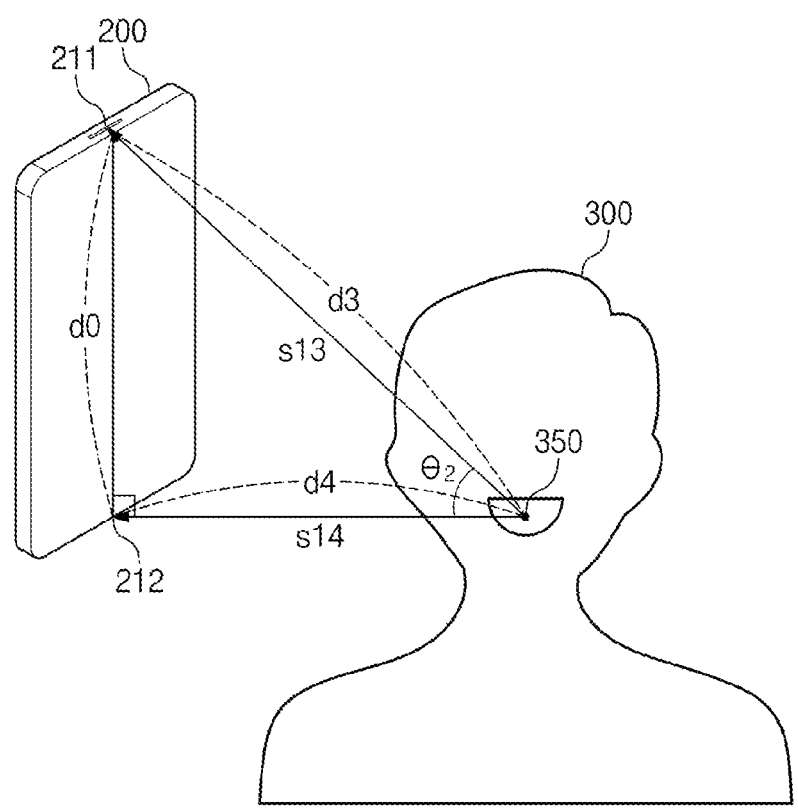
FIG. 7 illustrates a conceptual diagram descriptive of an example in which a user is moving away from an electronic device.

FIG. 7 illustrates a conceptual diagram descriptive of an example in which a user is moving away from an electronic device.

Compared with FIG. 3, FIG. 7 illustrates an example in which the user 300 is further moving away from the electronic device 200. That is, distances d3 and d4 are longer than the distances d1 and d2 of FIG. 3. Because the size of the electronic device 200 does not change, the distance d0 between the microphones 211 and 212 is the same as the distance d0 of FIG. 3. As described with reference to FIG. 3, as the distance d3 between the electronic device 200 and the user 300 increases, the included angle $\theta_2$ between the distance d3 and the distance d4 may become smaller. Accordingly, the included angle $\theta_2$ between the distance d3 and the distance d4 is smaller than the included angle $\theta_1$ of FIG. 3.

A sound may be generated from the sound source 350 at a particular time. The sound may be transferred to the microphones 211 and 212. In the following description, a sound that is transferred (provided) to the first microphone 211 is referred to as a "signal s13", and a sound that is transferred (provided) to the second microphone 212 is referred to as a "signal s14". Because the distances d3 and d4 are different, times when the signals s13 and s14 are received by the microphones 211 and 212 may be different.

A difference between times when the signals s13 and s14 are received by the microphones 211 and 212 is smaller than a difference between times when the signals s11 and s12 of FIG. 3 are received by the microphones 211 and 212. The electronic device 200 may change or determine the call mode, based on the difference between the times when the signals s13 and s14 are received by the microphones 211 and 212.

Figure 8:
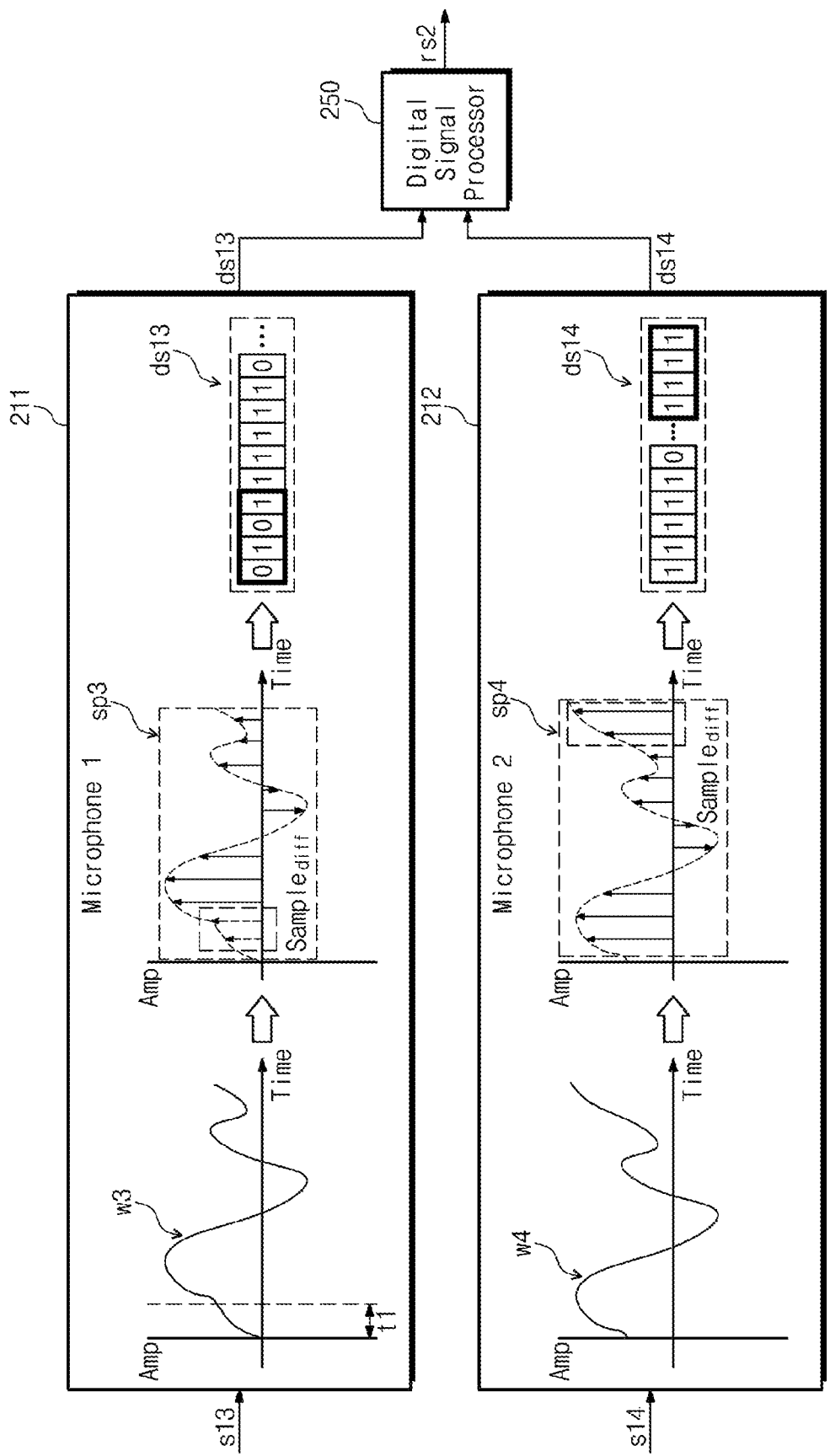
FIG. 8 illustrates a conceptual diagram descriptive of a change in the number of unique samples when a user is moving away from an electronic device.

FIG. 8 illustrates a conceptual diagram descriptive of a change in the number of unique samples when a user is moving away from an electronic device.

The microphones 211 and 212 may convert the signals s13 and s14 into digital signals ds13 and ds14 in the same way as described with reference to FIG. 4. The way the signals s13 and s14 are converted into the digital signals ds13 and ds14 by the microphones 211 and 212 is the same as the way described with reference to FIG. 4, and thus additional description will be omitted to avoid redundancy.

Referring to graph w3 and graph w4, a time when the signal s13 is received by the first microphone 211 may be later than (or after) a time when the signal s14 is received by the second microphone 212, by as much as "t1". The time "t1" may be shorter than the time "t0" of FIG. 4. That is, a phase difference between the signal s13 received by the first microphone 211 and the signal s14 received by the second microphone 212 in FIG. 8 may be smaller than a phase difference between the signal s11 received by the first microphone 211 and the signal s12 received by the second microphone 212 in FIG. 4. "t1" may be characterized as a time length.

Also, compared to FIG. 4, the number of unique samples of sample signals sp3 and sp4 in FIG. 8 may be smaller than the number of unique samples of the sample signals sp1 and sp2. The number of unique bits of the digital signals ds13 and ds14 may be smaller than the number of unique bits of the digital signals ds11 and ds12.

The digital signal processor 250 may receive the digital signals ds13 and ds14. The digital signal processor 250 may generate a signal rs2 based on the information included in the digital signals ds13 and ds14.

The detector 260 of FIG. 1 may receive the signal rs2. The detector 260 may determine the call mode of the electronic device 200, based on information included in the signal rs2. As described with reference to FIG. 4, the detector 260 may determine the call mode of the electronic device 200, based on either the numbers of unique samples of the sample signals sp3 and sp4 or the numbers of unique bits of the digital signals ds13 and ds14.

In the following description, it is assumed for better understanding that the detector 260 determines the call mode of the electronic device 200 based on the number of unique samples of the sample signal sp3. In this regard, assuming that a reference number is 3, the detector 260 may determine the call mode of the electronic device 200 as the active mode, in the case of FIG. 8. In contrast, the detector 260 may determine the call mode of the electronic device 200 as the inactive mode, in the case of FIG. 4.

Figure 9:
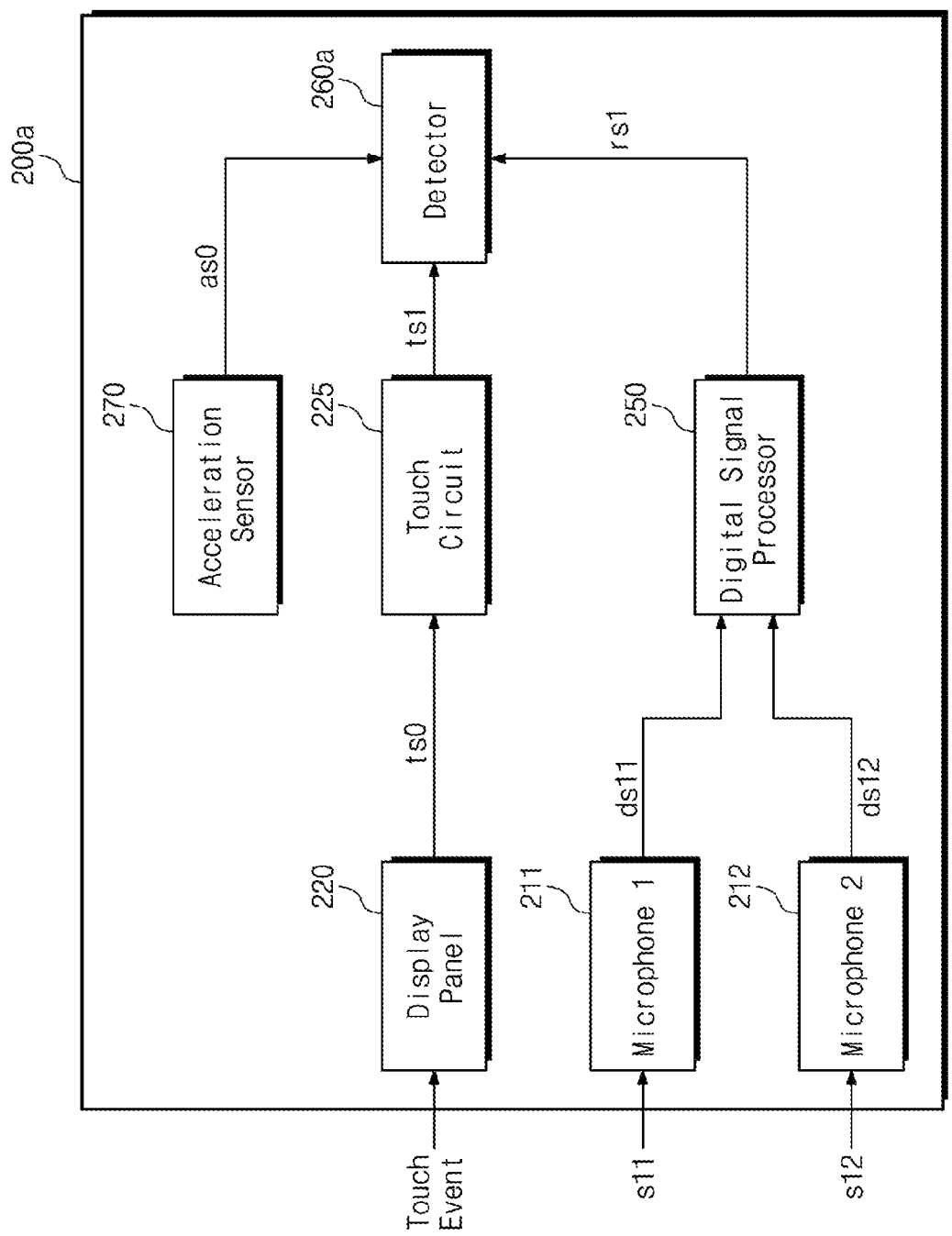
FIG. 9 illustrates a block diagram of an electronic device that determines a call mode in consideration of an external environment according to an embodiment of the inventive concepts.

FIG. 9 illustrates a block diagram of an electronic device that determines a call mode in consideration of an external environment according to an embodiment of the inventive concepts.

An electronic device 200a may determine a call mode of the electronic device 200a, based on external environment information. The external environment information may be information about a touch of the electronic device 200a by a user, a movement of the electronic device 200a, etc. as well as user's voice. The electronic device 200a may include the microphones 211 and 212, the digital signal processor 250, the display panel 220, a touch circuit 225, an acceleration sensor 270, and a detector 260a. However, the electronic device 200a according to other embodiments of the inventive concepts may further include various sensors and circuits for considering an external environment or a motion of a user, as well as the components illustrated in FIG. 9. Operations of the microphones 211 and 212 and the digital signal processor 250 are described with reference to FIGS. 1 to 4, and thus additional description will be omitted to avoid redundancy.

The face or a portion of the body of a user may touch a front surface of the electronic device 200a while the user talks over the phone. In detail, the user's ear may touch an upper portion of the display panel 220 while the user talks over the phone. When the face of the user contacts the display panel 220, the display panel 220 may output a signal ts0. The touch circuit 225 receives the signal ts0. The touch circuit 225 may analyze an event occurring in the display panel 220, based on the signal ts0.

However, the inventive concepts are not limited thereto. For example, in other embodiments the touch circuit 225 may not receive the separate signal ts0. Based on a pressure applied to the display panel 220, the touch circuit 225 may recognize that a touch event occurs or may analyze the touch event.

The touch circuit 225 may output a signal is 1, based on a result of analyzing the touch event. The signal ts1 may include information about whether the touch event satisfies a particular condition. For example, the particular condition may be associated with whether a touch event occurs on the upper portion of the display panel 220. When the touch event occurs on the upper portion of the display panel 220, the touch circuit 225 may output the signal ts1 having a first logical value. Also, when the touch event occurs on a lower portion of the display panel 220, the touch circuit 225 may output the signal ts1 having a second logical value. The first logical value and the second logical value may be different.

The acceleration sensor 270 may determine a movement of the electronic device 200a. In detail, the acceleration sensor 270 may detect a change in a speed at which the electronic device 200a moves per unit time. The acceleration sensor 270 may detect the change in the speed at which the electronic device 200a moves and may analyze the movement of the electronic device 200a.

The acceleration sensor 270 may output a signal as0, based on a result of analyzing the movement of the electronic device 200a. The signal as0 may have different logical values depending on the movement of the electronic device 200a. For example, the user may bring the electronic device 200a toward the user's face to answer the phone. When the movement of the electronic device 200a corresponds to the case where the electronic device 200a is moved toward the user's face, the signal as0 may have the first logical value. As another example, the user may change the call mode to the speaker phone mode while talking over the phone in the receive mode. In this case, the user may move the electronic device 200a so as to become distant from the user's face. When the movement of the electronic device 200a corresponds to the case where the electronic device 200a moves to become distant from the user's face, the signal as0 may have the second logical value.

The detector 260a may receive the signals rs1, ts1, and as0. The detector 260a may determine the call mode of the electronic device 200a based on the signals rs1, ts1, and as0, that is in consideration of a distance between the user and the electronic device 200a, a portion of an area of the display panel 220 that contacts the user, a movement of the electronic device 200a, etc. In detail, when the user's face is close to the electronic device 200a, the electronic device 200a may operate to determine the call mode as the inactive mode. When the user's face is distant from the electronic device 200a, the electronic device 200a may operate to determine the call mode as the active mode.

Figure 10:
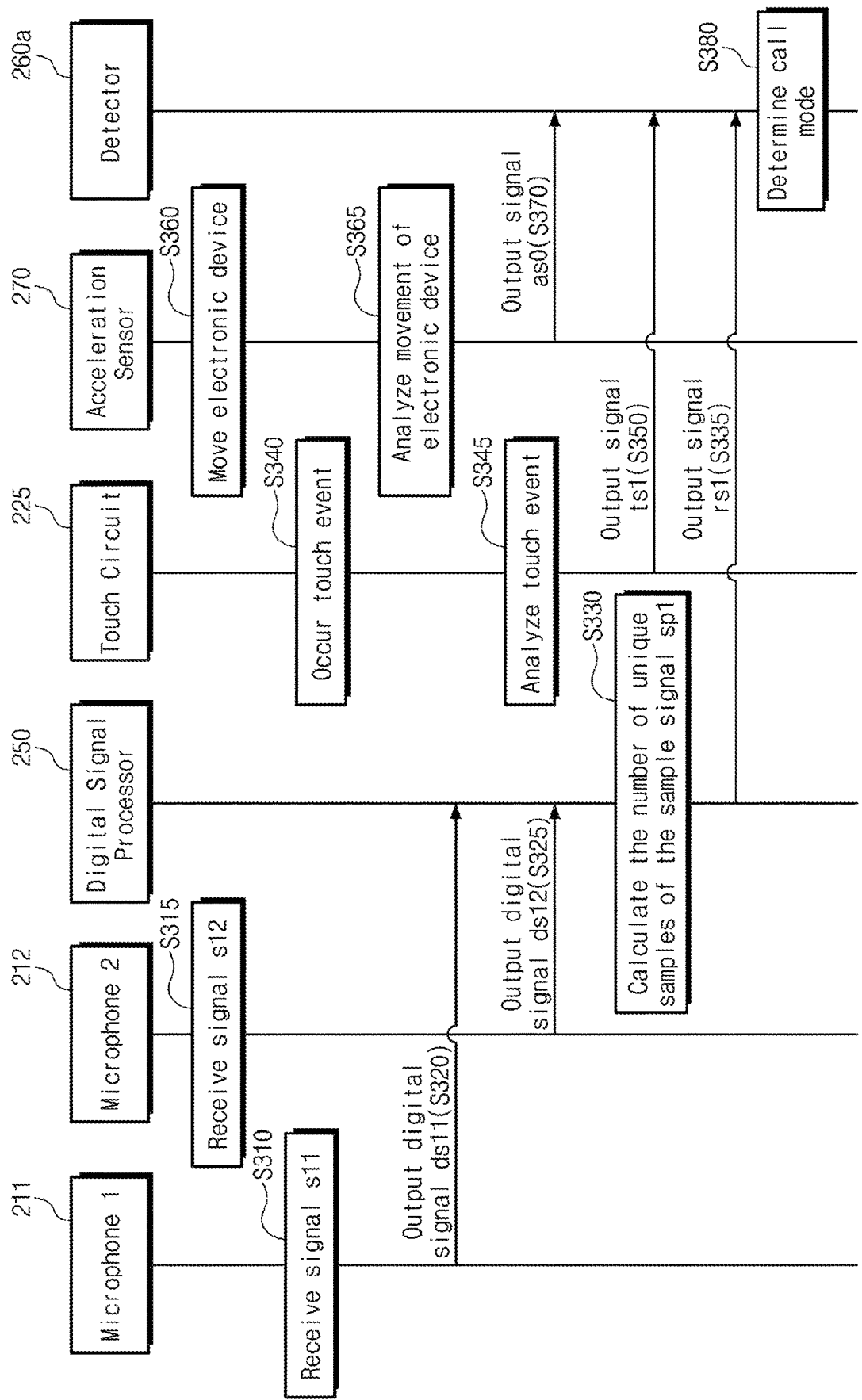
FIG. 10 illustrates a flowchart descriptive of an operation in which an electronic device of FIG. 9 determines a call mode.

FIG. 10 illustrates a flowchart descriptive of an operation in which an electronic device of FIG. 9 determines a call mode.

In operation S310, the first microphone 211 receives the signal s11. The first microphone 211 may convert the signal s11 into the digital signal ds11.

In operation S315, the second microphone 212 receives the signal s12. The second microphone 212 may convert the signal s12 into the digital signal ds12. The signals s11 and s12 may be simultaneously generated by a user. Because it is assumed in the description of FIG. 3 that the user 300 is located on the same horizontal line as the second microphone 212, operation S315 may be performed prior to operation S310.

In operation S320, the first microphone 211 outputs the digital signal ds11 to the digital signal processor 250.

In operation S325, the second microphone 212 outputs the digital signal ds12 to the digital signal processor 250. The digital signal processor 250 thus receives the digital signals ds11 and ds12.

In operation S330, the digital signal processor 250 compares the digital signals ds11 and ds12 to calculate the number of unique samples of the sample signal sp1.

In operation S335, the digital signal processor 250 outputs the signal rs1 to the detector 260a. The signal rs1 may include information about the number of unique samples of the sample signal sp1.

In operation S340, a touch event occurs.

In operation S345, the touch circuit 225 analyzes the touch event.

In operation S350, the touch circuit 225 outputs the signal ts1 to the detector 260a. The signal ts1 may include information about a result of analyzing the touch event by the touch circuit 225.

In operation S360, the electronic device 200a is moved.

In operation S365, the acceleration sensor 270 analyzes a movement of the electronic device 200a.

In operation S370, the acceleration sensor 270 outputs the signal as0 to the detector 260a. The signal as0 may include information about a result of analyzing the movement of the electronic device 200a by the acceleration sensor 270. Operation S315, operation S340, and operation S360 may be performed at the same time regardless of an order illustrated in FIG. 10, or may be performed in reverse order to the order illustrated in FIG. 10.

In operation S380, the detector 260a determines the call mode based on the signals rs1, ts1, and as0. The detector 260a may determine the call mode in consideration of the signals rs1, ts1, and as0, thus selecting the call mode appropriate for an external environment or situation.

Figure 11:
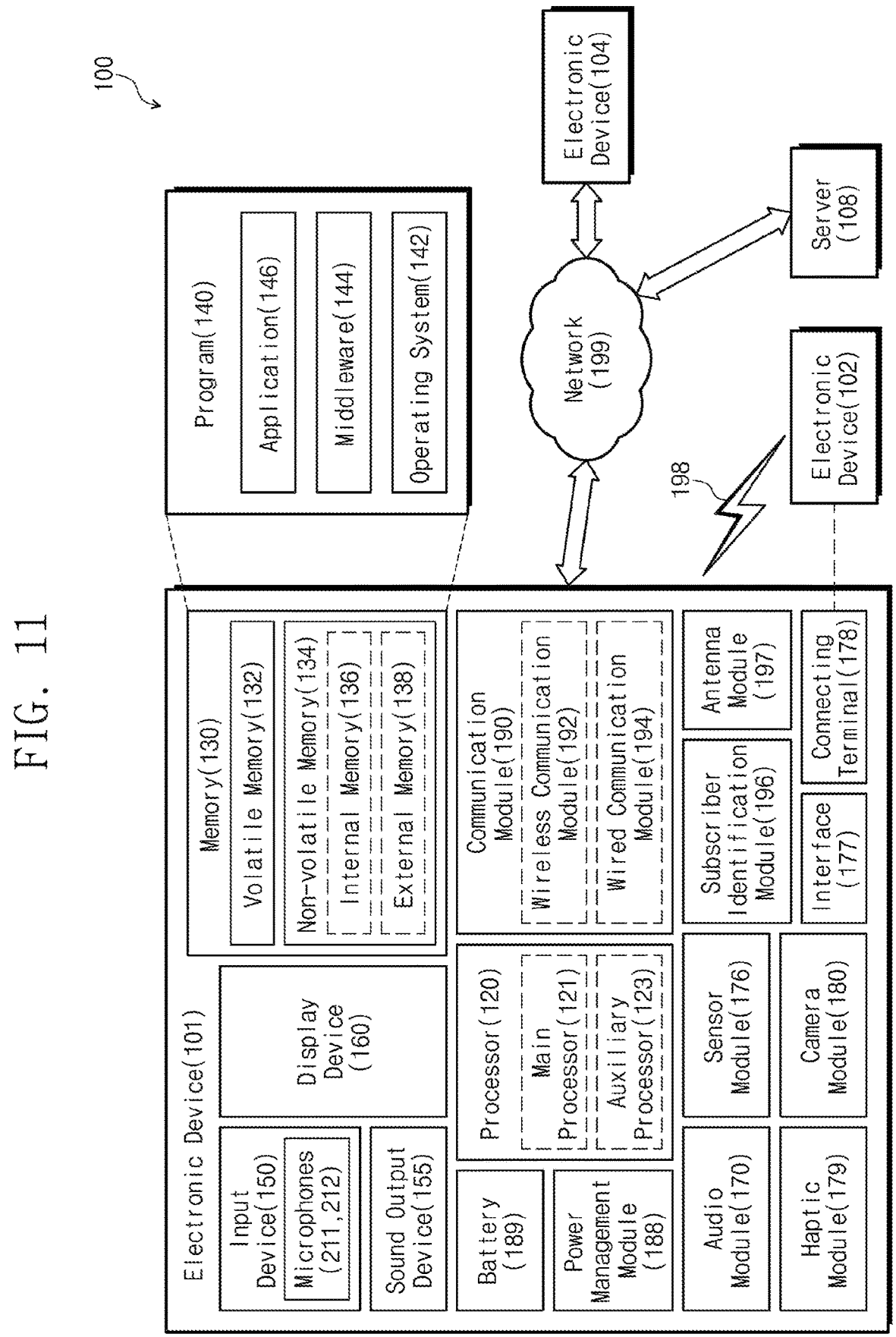
FIG. 11 illustrates a block diagram of an electronic device in a network environment according to various embodiments of the inventive concepts.

FIG. 11 illustrates a block diagram of an electronic device in a network environment according to various embodiments of the inventive concepts.

Referring to FIG. 11, an electronic device 101 may communicate with an electronic device 102 through a first network 198 (e.g., a short-range wireless communication) or may communicate with an electronic device 104 or a server 108 through a second network 199 (e.g., a long-distance wireless communication) in a network environment 100. According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) among components of the electronic device 101 may be omitted or other components may be added to the electronic device 101. According to some embodiments, some components may be integrated and implemented as in the case of the sensor module 176 (e.g., a fingerprint sensor, an iris sensor, or an illuminance sensor) embedded in the display device 160 (e.g., a display). The various modules may be physically implemented by analog and/or digital circuits (hardware) such as logic gates, integrated circuits, microprocessors, microcontrollers, memory circuits, passive electronic components, active electronic components, optical components, hardwired circuits and the like, and may optionally be driven by firmware and/or software.

The processor 120 may operate, for example, software (e.g., a program 140) to control at least one of other components (e.g., a hardware or software component) of the electronic device 101 connected to the processor 120 and may process and compute a variety of data. The processor 120 may load a command set or data, which is received from other components (e.g., the sensor module 176 or the communication module 190), into a volatile memory 132 of memory 130, may process the loaded command or data, and may store result data into a nonvolatile memory 134 of memory 130. According to an embodiment, the processor 120 may include a main processor 121 (e.g., a central processing unit or an application processor), and an auxiliary processor 123 (e.g., a graphic processing device, an image signal processor, a sensor hub processor, or a communication processor) which operates independently from the main processor 121, additionally or alternatively uses less power than the main processor 121, or is specified to perform a designated function. Here, the auxiliary processor 123 may operate separately from the main processor 121 or embedded. In this case, the auxiliary processor 123 may control, for example, at least some of functions or states associated with at least one component (e.g., the display device 160, the sensor module 176, or the communication module 190) among the components of the electronic device 101 instead of the main processor 121 while the main processor 121 is in an inactive state (e.g., sleep state) or together with the main processor 121 while the main processor 121 is in an active (e.g., an application execution) state. According to an embodiment, the auxiliary processor 123 (e.g., the image signal processor or the communication processor) may be implemented as a part of another component (e.g., the camera module 180 or the communication module 190) that is functionally related to the auxiliary processor 123. The memory 130 may store a variety of data used by at least one component (e.g., the processor 120 or the sensor module 176) of the electronic device 101, for example, software (e.g., the program 140) and input data or output data with respect to commands associated with the software. The memory 130 may include the volatile memory 132 or the nonvolatile memory 134. The nonvolatile memory 134 may include internal memory 136 as part of the electronic device 101 and external memory 138 which may for example be removably connectable to electronic device 101.

The program 140 may be stored in the memory 130 as software and may include, for example, an operating system 142, middleware 144, or an application 146.

The input device 150 may be a device for receiving a command or data, which is used for a component (e.g., the processor 120) of the electronic device 101, from an outside (e.g., a user) of the electronic device 101 and may include, for example, a microphone, a mouse, or a keyboard among other input devices.

In particular, the input device 150 according to an embodiment of the inventive concepts may include the microphones 211 and 212. The input device 150 may receive a user's voice through the microphones 211 and 212. The input device 150 may analyze the user's voice. The electronic device 101 may determine or change a call mode, based on a result of analyzing the user's voice.

The sound output device 155 may be a device for outputting a sound signal to the outside of the electronic device 101 and may include, for example, a speaker used for general purposes, such as multimedia play or recordings play, and a receiver used only for receiving calls. According to an embodiment, the receiver and the speaker may be either integrally or separately implemented. The display device 160 may be a device for visually presenting information to the user and may include, for example, a display, a hologram device, or a projector and a control circuit for controlling a corresponding device. According to an embodiment, the display device 160 may include touch circuitry or a pressure sensor for measuring an intensity of pressure on the touch.

The audio module 170 may convert a sound and an electrical signal in dual directions. According to an embodiment, the audio module 170 may obtain the sound through the input device 150 or may output the sound through an external electronic device (e.g., the electronic device 102 (e.g., a speaker or a headphone)) wired or wirelessly connected to the sound output device 155 or the electronic device 101.

The sensor module 176 may generate an electrical signal or a data value corresponding to an operating state (e.g., power or temperature) inside or an environmental state outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor, etc.

The interface 177 may support a designated protocol wired or wirelessly connected to the external electronic device (e.g., the electronic device 102). According to an embodiment, the interface 177 may include, for example, an High-Definition Multimedia Interface (HDMI™), a USB (universal serial bus) interface, a Secure Digital (SD™) card interface, or an audio interface.

A connecting terminal 178 may include a connector that physically connects the electronic device 101 to the external electronic device (e.g., the electronic device 102), for example, a High-Definition Multimedia Interface (HDMI™) connector, a USB connector, a Secure Digital (SD™) card connector, or an audio connector (e.g., a headphone connector).

The haptic module 179 may convert an electrical signal to a mechanical stimulation (e.g., vibration or movement) or an electrical stimulation perceived by the user through tactile or kinesthetic sensations. The haptic module 179 may include, for example, a motor, a piezoelectric element, or an electric stimulator.

The camera module 180 may shoot a still image or a video image. According to an embodiment, the camera module 180 may include, for example, at least one lens, an image sensor, an image signal processor, or a flash, among other circuitry. The power management module 188 may be a module for managing power supplied to the electronic device 101 and may serve as at least a part of a power management integrated circuit (PMIC).

The battery 189 may be a device for supplying power to at least one component of the electronic device 101 and may include, for example, a non-rechargeable (primary) battery, a rechargeable (secondary) battery, or a fuel cell.

The communication module 190 may establish a wired or wireless communication channel between the electronic device 101 and the external electronic device (e.g., the electronic device 102, the electronic device 104, or the server 108) and support communication execution through the established communication channel. The communication module 190 may include at least one communication processor operating independently from the processor 120 (e.g., the application processor) and supporting the wired communication or the wireless communication. According to an embodiment, the communication module 190 may include a wireless communication module 192 (e.g., a cellular communication module, a short-range wireless communication module, or a GNSS (global navigation satellite system) communication module) or a wired communication module 194 (e.g., an LAN (local area network) communication module or a power line communication module) and may communicate with the external electronic device using a corresponding communication module among them through the first network 198 (e.g., the short-range communication network such as a Bluetooth, a Wi-Fi direct, or an IrDA (infrared data association)) or the second network 199 (e.g., the long-distance wireless communication network such as a cellular network, an Internet, or a computer network (e.g., LAN or WAN)). The above-mentioned various communication modules 190 may be implemented into one chip or into separate chips, respectively.

According to embodiments, the wireless communication module 192 may identify and authenticate the electronic device 101 using user information stored in the subscriber identification module 196 in the communication network.

The antenna module 197 may include one or more antennas to transmit or receive the signal or power to or from an external source. According to embodiments, the communication module 190 (e.g., the wireless communication module 192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or a Mobile Industry Processor Interface (MIPI™)) used between peripheral devices to exchange signals (e.g., a command or data) with each other. According to embodiments, the command or data may be transmitted or received between the electronic device 101 and the external electronic device 104 through the server 108 connected to the second network 199. Each of the electronic devices 102 and 104 may be the same as or different types as or from the electronic device 101. According to embodiments, all or some of the operations performed by the electronic device 101 may be performed by another electronic device or a plurality of external electronic devices. According to embodiments, when the electronic device 101 performs some functions or services automatically or by request, the electronic device 101 may request the external electronic device to perform at least some of the functions related to the functions or services, in addition to or instead of performing the functions or services by itself. The external electronic device receiving the request may carry out the requested function or the additional function and transmit the result to the electronic device 101. The electronic device 101 may process the received result as it is or additionally to provide the requested functions or services. To this end, for example, a cloud computing, distributed computing, or client-server computing technology may be used.

According to embodiments of the inventive concepts, an electronic device may change a call mode depending on a distance between the electronic device and a user. Accordingly, the number of times that the electronic device abnormally operates due to abnormal recognition of a motion of the user while providing a call service may decrease. Also, the electronic device may reduce a power necessary to predict the distance between the electronic device and the user.

While the inventive concepts have been described with reference to exemplary embodiments thereof, it should be apparent to those of ordinary skill in the art that various changes and modifications may be made thereto without departing from the spirit and scope of the inventive concepts as set forth in the following claims.

What is claimed is:

1. An electronic device comprising:
   a first microphone at a first location and configured to sample a sound from a sound source to generate a first signal;
   a second microphone at a second location spaced from the first location and configured to sample the sound from the sound source to generate a second signal;
   a digital signal processor configured to compare the first signal and the second signal to count a number of unmatched bits from among bits of the first signal which are not matched with bits of the second signal; and
   a detector configured to determine a call mode for the electronic device based on the count of the number of unmatched bits.

2. The electronic device of claim 1, wherein the detector is configured to compare the number of unmatched bits with a reference number to determine the call mode.

3. The electronic device of claim 2, wherein the detector is configured to select a first call mode for deactivating a display panel of the electronic device when the number of unmatched bits is more than the reference number and to select a second call mode for activating the display panel when the number of unmatched bits is less than the reference number.

4. The electronic device of claim 1, wherein:
   the first microphone is configured to sample the sound to generate a first sample signal and quantize the first sample signal to generate the first signal, and
   the second microphone is configured to sample the sound to generate a second sample signal and quantize the second sample signal to generate the second signal.

5. The electronic device of claim 4, wherein the digital signal processor is configured to compare the first signal and the second signal and to count a number of samples from among samples of the first sample signal which are not matched with samples of the second sample signal.

6. The electronic device of claim 5, wherein the detector is configured to:
   compare the number of unmatched samples with a reference number,
   select a first call mode for deactivating a display panel of the electronic device when the number of unmatched samples is more than the reference number, and
   select a second call mode for activating the display panel when the number of unmatched samples is less than the reference number.

7. An electronic device comprising:
   a first microphone at a first location and configured to receive a sound output from a sound source and to generate a first signal responsive to the sound;
   a second microphone at a second location spaced from the first location and configured to receive the sound output from the sound source and to generate a second signal responsive to the sound; and
   a detector configured to determine:
      an inactive mode for deactivating a display panel of the electronic device when a time length between a first time when the sound is received by the first microphone and a second time when the sound is received by the second microphone is longer than a reference length, and
      an active mode for activating the display panel when the time length is shorter than the reference length.

8. The electronic device of claim 7, wherein the time length is inversely proportional to a distance between the sound source and the electronic device.

9. The electronic device of claim 7, wherein:
   the electronic device outputs a sound generated in the electronic device with a normal volume in the inactive mode, and
   the electronic device outputs the sound generated in the electronic device with a volume higher than the normal volume in the active mode.

10. The electronic device of claim 7, further comprising:
    a display panel located on a front surface of the electronic device, wherein
    the first microphone and the second microphone are located on side surfaces of the electronic device.

11. The electronic device of claim 10, wherein:
    the first microphone is located on a first side surface from among the side surfaces of the electronic device, and wherein the second microphone is located on a second side surface from among the side surfaces of the electronic device,
    the first and second side surfaces are opposite side surfaces from among the side surfaces of the electronic device.

12. A mobile device providing a call service, the mobile device comprising:
    a digital signal processor configured to compare a first signal generated based on a sound from a sound source and a second signal generated based on the sound from the sound source and determine a phase difference between the first signal and the second signal; and
    a detector configured to determine:
       a receive mode in which the mobile device outputs a sound generated in the mobile device with a normal volume when the phase difference is greater than a reference phase difference, and
       a speaker mode in which the mobile device outputs the sound generated in the mobile device with a volume higher than the normal volume when the phase difference is less than a reference phase difference, wherein:

the first signal is generated based on the sound received at a first location on the mobile device, the second signal is generated based on the sound received at a second location on the mobile device, and the first location is spaced from the second location.

13. The mobile device of claim 12, further comprising:

a touch circuit configured to analyze a touch event from an outside of the mobile device to obtain external environment information associated with an area of the mobile device where the touch event occurred, wherein the detector is configured to determine a call mode based on the external environment information.

14. The mobile device of claim 12, further comprising:

an acceleration sensor configured to analyze a movement of the mobile device to obtain external environment information associated with the movement, wherein the detector is configured to determine a call mode based on the external environment information.

15. The mobile device of claim 13, wherein the detector is configured to determine the call mode from among a first call mode for deactivating a display panel of the mobile device and a second call mode for activating the display panel.

16. The mobile device of claim 14, wherein the detector is configured to determine the call mode from among a first call mode for deactivating a display panel of the mobile device and a second call mode for activating the display panel.

* * * * *